United States Patent [19]

Casado

[11] 4,123,050
[45] Oct. 31, 1978

[54] TOY AIRCRAFT FLIGHT SIMULATOR

[75] Inventor: Fernando Casado, San Sebastian, Spain

[73] Assignee: Bianchi, S.A., San Sebastian, Spain

[21] Appl. No.: 730,917

[22] Filed: Oct. 8, 1976

[30] Foreign Application Priority Data

Oct. 8, 1975 [ES] Spain .................................... 215.694

[51] Int. Cl.² .......................... G09B 9/08; A63G 31/16
[52] U.S. Cl. ...................................... 273/1 E; 272/18; 35/12 R
[58] Field of Search .................. 272/18, 1 C, 17, 8 D, 272/8 P; 35/11 R, 11 A, 12 R, 12 C, 12 F, 12 K, 12 L, 12 S, 12 N; 273/101.2, 1 E

[56] References Cited

U.S. PATENT DOCUMENTS

| 3,060,598 | 10/1962 | Gilbert et al. | 35/12 L |
| 3,359,408 | 12/1967 | Briggs | 35/12 N |

FOREIGN PATENT DOCUMENTS

| 1,025,548 | 2/1950 | France | 35/12 N |
| 60,130 | 9/1954 | France | 35/12 N |
| 474,529 | 12/1952 | Italy | 35/12 N |

*Primary Examiner*—William H. Grieb
*Assistant Examiner*—Lawrence E. Anderson
*Attorney, Agent, or Firm*—Blum, Moscovitz, Friedman & Kaplan

[57] ABSTRACT

A toy aircraft flight simulator which may also be used to simulate combat flight situations. The device simulates directional and velocity changes of aircraft flight, aircraft firing at targets on the ground, anti-aircraft ground fire, and a complete "shooting down" of the aircraft.

The flight simulator includes a display screen and a rotating drum which may be displaced axially having a translucent screen on its periphery. A light source movably mounted within the drum operates to project an aerial landscape image onto the display screen. A unitary control operates both the axial displacement of the drum and the movement of the light source.

14 Claims, 5 Drawing Figures

TOY AIRCRAFT FLIGHT SIMULATOR

BACKGROUND OF THE INVENTION

This invention relates generally to toy aircraft flight simulators. While toy aircraft flight simulators have been known in the art, the present device presents an improved approach to multi-functional yet relatively simple and inexpensive simulators.

SUMMARY OF THE INVENTION

Generally speaking, in accordance with the invention, a toy aircraft flight simulator is provided, which may be used to perform both flying and combat maneuvers. The device has a rotating drum capable of being displaced axially and a translucent wall carries aerial landscape views. The aerial landscape views carried on the rotating drum are projected onto a translucent screen by means of a light source within the drum. The light source is movable with respect to the translucent drum in order to simulate changes in flight altitude. The outside of the rotating drum is arranged with a number of projections which during rotation actuate electrical contacts which simulate various combat situations. A single control handle is used to displace the drum axially and to move the light source. Another handle controls the speed of rotation of the drum. The assembly is provided with a number of signal lamps to simulate various combat and flight situations.

Accordingly, it is an object of this invention to provide an improved toy aircraft flight simulator which may be used to simulate altitude, directional, and velocity changes of aircraft flight.

Another object is to provide an improved toy aircraft flight simulator which simulates firing upon and hitting ground targets.

A further object of the invention is to provide an improved toy aircraft flight simulator which simulates anti-aircraft fire from the ground.

Yet another object of the invention is to provide an improved toy aircraft flight simulator which is capable of simulating a direct hit and consequent "shooting down" of the aircraft.

Still another object of the invention is to provide an improved toy aircraft flight simulator that is relatively simple to construct, repair and operate.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
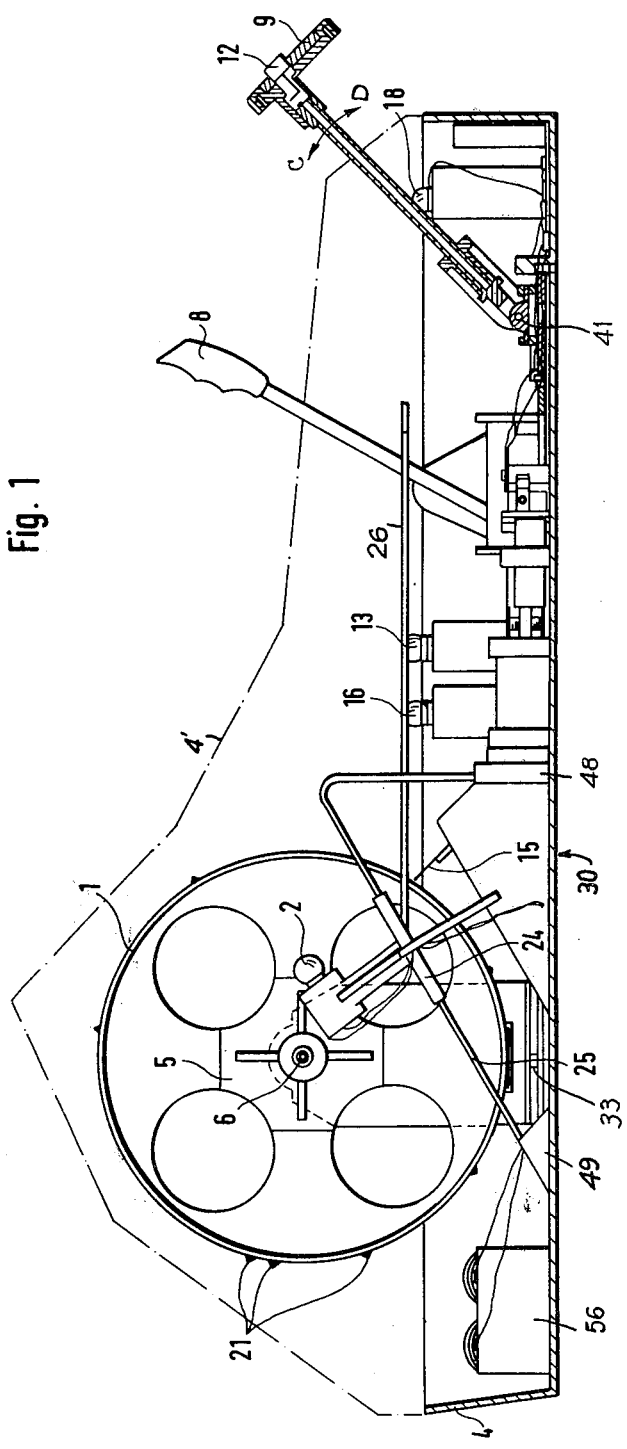
FIG. 1 is a side elevational view of the toy aircraft flight simulator of the present invention, with the upper housing and U-shaped bracket removed in order to show the components.
Figure 2:
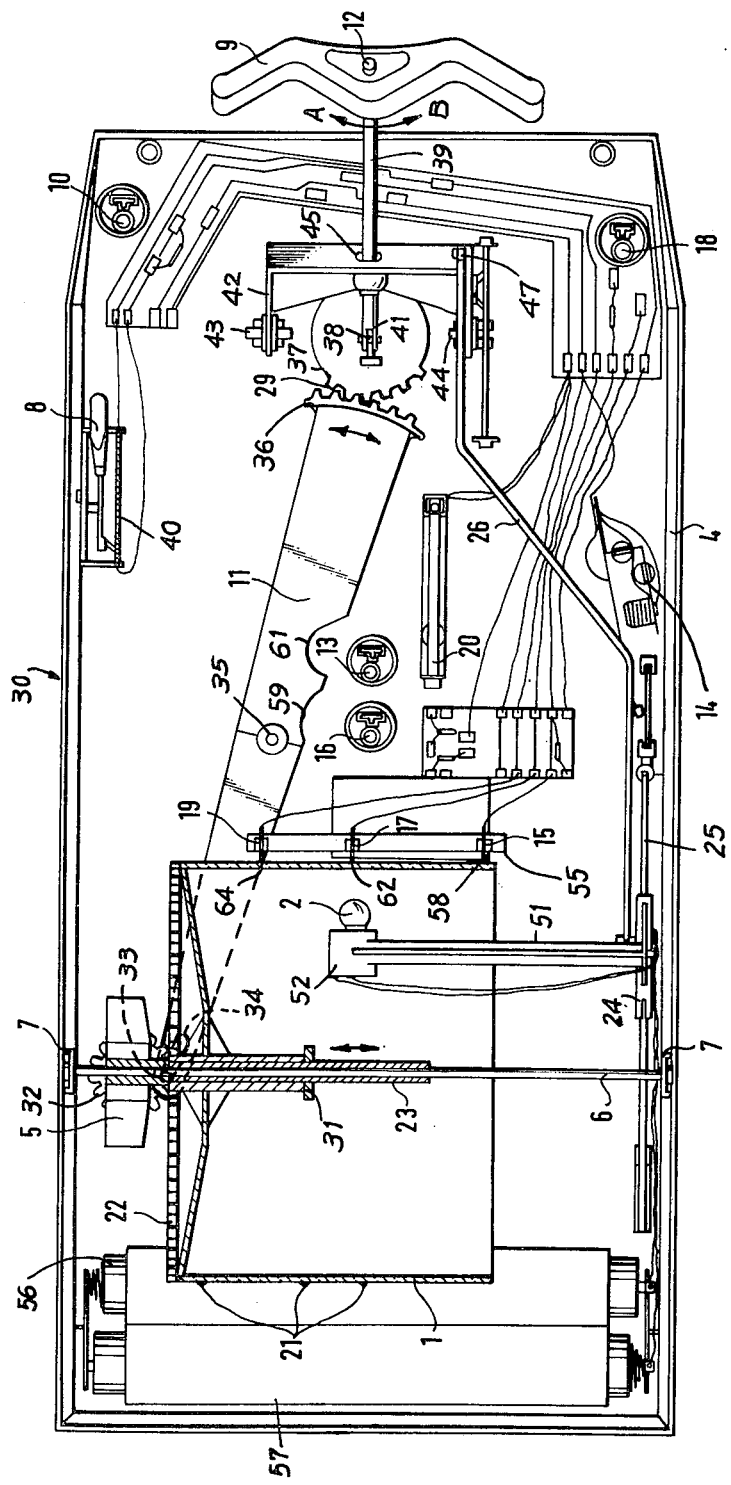
FIG. 2 is a top plan view thereof.
Figure 3:
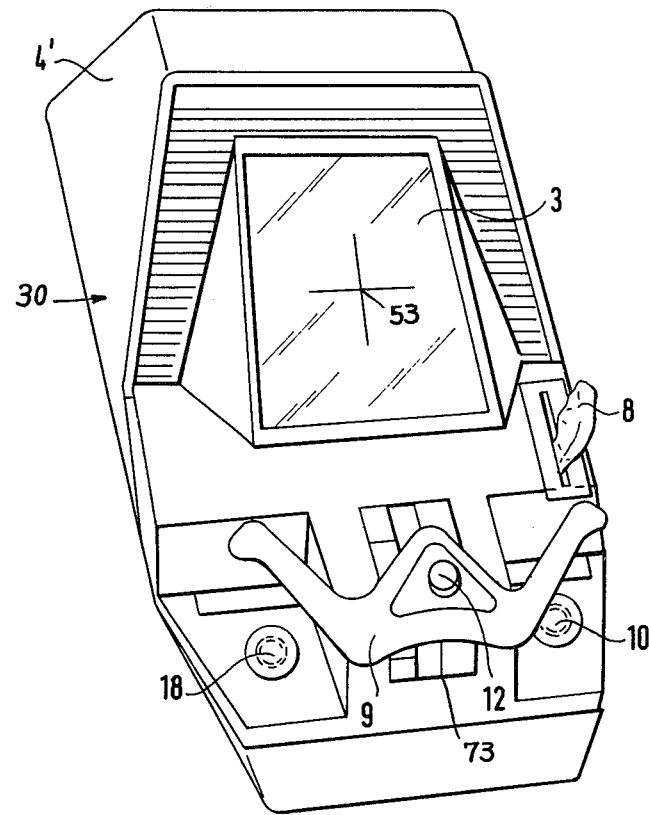
FIG. 3 is a perspective view of the toy aircraft flight simulator of the present invention.

Referring now to FIGS. 1 through 3, the toy aircraft flight simulator, generally indicated at 30 has a lower housing 4, with a pair of brackets 7 mounted thereto. Brackets 7 support a rod 6 which has a sleeve 23 slidably mounted thereon. Rotatably mounted to sleeve 23 is a bearing 31 to which is mounted a cylindrical translucent drum 1 which has an aerial landscape view depicted on its periphery.

Mounted on sleeve 23 is an electric motor 5 which is connected to batteries 56 through a rheostat 40. Batteries 56 are carried in a holder 57 mounted at the rear of lower housing 4. Motor 5 has a spur gear 32 in mesh with a gear 22 which surrounds the periphery of the edge of translucent drum 1. A speed control handle 8 connected to rheostat 40 is used to vary the speed of motor 5 and thereby the speed of rotation of translucent drum 1. The circuitry of motor 5 will be more completely described hereafter.

Motor 5 and translucent drum 1 are axially displaceable as an assembly along rod 6 and translucent drum 1 is rotatably mounted with respect to lower housing 4.

A pin 33 is mounted to the underside of motor 5. Pin 33 rides in an elongated slot 34 in one end of a lever 11. Lever 11 is pivotally mounted at 35 to lower housing 4. The other end of lever 11 has a toothed section 36 which meshes with the teeth 29 of a plate 37. Plate 37 is rotatably mounted to lower housing 4 about an axis 38. Connected to plate 37 at axis 38 is a universal joint 41 which is connected to a main control handle 9 through a rod 39. When main control handle is rotated in directions A or B as indicated by the arrow in FIG. 2, the rotation of rod 39 is translated to a corresponding axial displacement of translucent drum 1 and motor 5 through plate 37 and lever 11.

A U-shaped bracket 42 is pivotally mounted to lower housing 4 at 43 and 44. Bracket 42 has an opening 45 through which rod 39 extends. A connecting lever 26 is pivotaly mounted at 47 to U-shaped bracket 42. The other end of connecting lever 26 is pivotaly mounted to a lamp holder 24. Lamp holder 24 is slidably mounted along a sloping rod 25 which is mounted to lower housing 4 by means of mounts 48 and 49. Lamp holder 24 has an extension 51 which extends to the longitudinal center line of lower housing 4. Attached to extension 51 is a socket 52 carrying a lamp 2. As will hereinafter be further described, lamp 2 is connected in circuit with motor 5.

Toy aircraft flight simulator 30 has an upper housing 4' in which a translucent screen 3 is mounted. Translucent screen 3 has a cross-hair 53 inscribed thereon. The instant invention simulates aircraft flight by the projection of the aerial landscape view carried on translucent drum 1 onto translucent screen 3 by means of lamp 2. The rotation of translucent drum 1 by motor 5 simulates the motion over ground of an aircraft. The axial displacement of drum 3 in response to a turning motion of main control handle 9 simulates a turning of the aircraft. The movement of lamp 2 within drum 1 along sloping bar 25 causes the alteration of the size of the landscape image projected by drum 1, due to the convergence of light, thus simulating a change in aircraft altitude.

Toy aircraft flight simulator 30 also provides for the simulation of aircraft combat situations. The operator may both fire on and be fired upon from the ground below. Translucent drum 1 has a series of projections 21 mounted around its periphery. A bar 55 mounted on lower housing 4 in proximity to translucent drum 1 has three reed switches 15, 17 and 19 located along its length. The rotation and axial displacement of translucent drum 1 will bring projections 21 selectively into contact with reed switches 15, 17 and 19. Reed switches 15, 17 and 19 operate a variety of circuits which simulate various combat situations, as will be hereinafter described.

Figure 5:
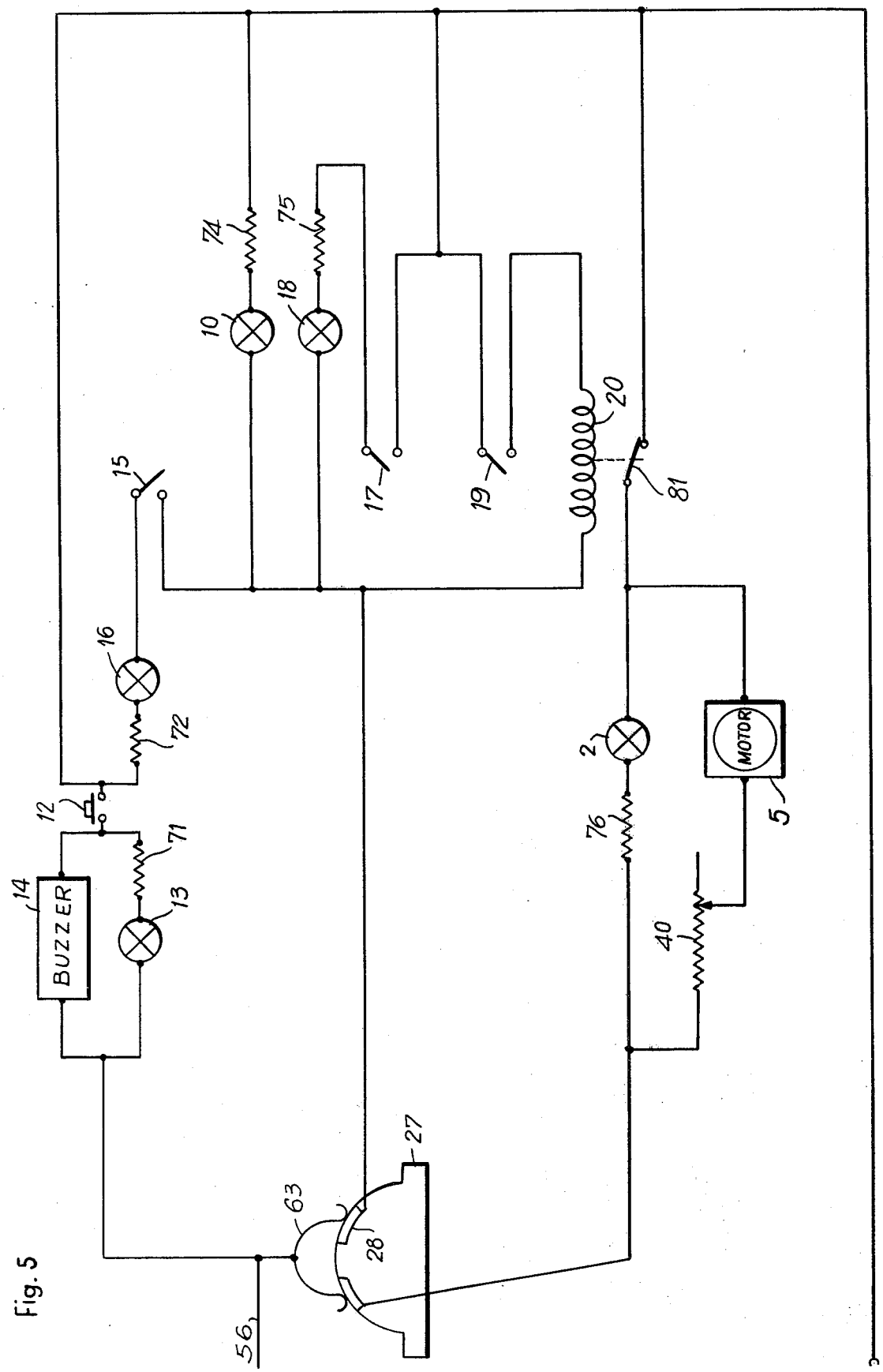
FIG. 5 is a schematic diagram of the circuitry of the instant invention.

The simulation of aircraft combat maneuvers is accomplished by the circuity of FIG. 5. Main control handle 9 has a firing button 12 mounted at its center. Firing button 12 is connected to a power source (batteries) 56 through a circuit including a buzzer 14. Bridging buzzer 14 is a circuit having a serially connected bulb 13 and a resistor 71. When firing button 12 is depressed, buzzer 14, simulating the sound of a machine gun and bulb 13 (preferably white in color) will be activated. Serially connected to firing button 12 is a circuit containing a bulb 16 serially connected with resistor 72 and reed switch 15. A ground target provided on translucent screen 1 has a corresponding projection 58. When projection 58 contacts and closes reed switch 15 and if firing button 12 is depressed and if main control handle 9 is in the proper angular position (described hereafter) the circuit between bulb 16 (preferably white in color) and batteries 56 will be closed, activating bulb 16 to indicate a "hit" on the target. Bulbs 13 and 16 are located beneath translucent screen 3 so that they will illuminate the screen. Lever 11 is provided with notches 59, 61 (FIG. 2) to clear lights 16, 13 respectively when lever 11 is pivoted.

Figure 4:
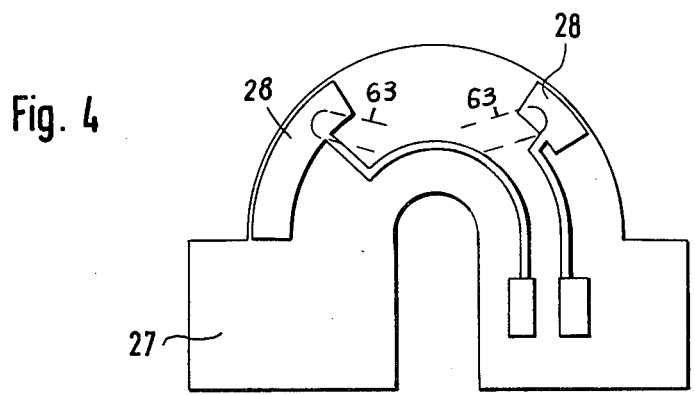
FIG. 4 is a plan view of the printed circuit board of the main control handle.

Certain of the combat simulating circuits of FIG. 5 are activated only when main control handle 9 is in certain angular positions. Rod 39 connected to main control handle 9 has a wiper arm 63 (FIG. 4). Wiper arm 63 contacts a printed circuit board 27 mounted under upper housing 4' adjacent to a slot 73 (FIG. 3) in upper housing 4' through which rod 39 extends. Printed circuit board 27 has contacts 28, which will be engaged by wiper arm 63 when main control handle 9 is in certain angular positions thus completing a circuit between wiper arm 63 and contacts 28. When wiper arm 63 engages contacts 28, a bulb 10 (preferably green in color) serially connected with a resistor 74 will be activated. The activation of bulb 10 indicates to the operator that the main control handle is in the position for the simulation of combat. Bulb 10 is mounted above upper housing 4 to the right of main control handle 9.

The proper positioning of main control handle 9 activates "anti-aircraft ground fire" circuits. The simulation of a "near miss" by ground fire is accomplished by a circuit having a bulb 18 (preferably red) serially connected with resistor 75 and reed switch 17. An anti-aircraft implacement depicted on translucent screen 1 has a corresponding projection 62. When projection 62 contacts and closes reed switch 17, bulb 18 mounted on upper housing 4' to the left of main control handle 9, is activated. Thus, the operator must use main control handle 9 to make proper directional changes in order to avoid the anti-aircraft implacements.

A "direct hit" by ground fire and a consequent shooting down of the aircraft is also simulated by the instant invention. Lamp 2 is serially connected to a resistor 76, power source 56 and a switch 81 controlled by a solenoid 20. Bridging lamp 2 and resistor 76 is the serial connection of rheostat 40 and motor 5. Switch 81 is normally closed. Solenoid 20 is serially connected with reed switch 19 to power source 56. When a projection 64 contacts reed switch 19, solenoid 20 is activated, opening switch 81 and the circuit containing bulb 2 and motor 5, thereby causing a complete stoppage of play thus simulating a "shooting down" of the aircraft. In order to resume play, main control handle 9 is rotated in either direction A or B (FIG. 2) to move projection 64 away from reed switch 19 to deactivate solenoid 20 and thereby reactivating the motor and lamp circuits.

It is thus seen that the instant invention provides a life-like simulation of aircraft flight and combat maneuvers. The device presents a challenge to the operator's skill by requiring him to fire on ground targets and avoid the consequences of ground fire. The level of difficulty of play may be adjusted by increasing the rotational speed of translucent drum 1, by controlling rheostat 40 through handle 8.

It will thus be seen that the objects set forth above among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A toy aircraft flight simulator comprising a display screen, a rotating drum, the periphery of said rotating drum being a translucent screen having an aerial landscape image depicted thereon, means for rotating said drum, a light source with said drum, means for displacing said light source within said drum so as to vary the distance from said light source to said periphery of said drum, said light source projecting said aerial image upon said display screen and said image being altered in size as said light source is displaced within said drum, means for axially displacing said drum, and unitary control means, said unitary control means having first and second control movements, said first control movement operatively effecting said means for axially displacing said drum, said second control movement operatively effecting said means for displacing said light source within said drum.

2. A toy aircraft flight simulator as claimed in claim 1, further including a guide rod, said guide rod being located transversely with respect to said axis of said rotating drum, a sleeve slideably mounted on said guide rod, said sleeve carrying said light source for displacement.

3. A toy aircraft flight simulator as claimed in claim 1, further comprising a rod disposed along the axis of said drum, a sleeve slideable along said rod, said drum being rotatably mounted to said sleeve.

4. A toy aircraft flight simulator as claimed in claim 3, wherein said means for rotating said drum are mounted for slideable displacement along said sleeve.

5. A toy aircraft flight simulator as claimed in claim 1, further including second control means, said second control means varying the speed of said means for rotating said drum.

6. A toy aircraft flight simulator as claimed in claim 1, wherein said second control means is located proximate said unitary control means and said second control means being pivotal to effect variance of said speed of said drum rotating means.

7. A toy aircraft flight simulator as claimed in claim 1, wherein said second control movement comprises back-and-forth movement of said unitary control means.

8. A toy aircraft flight simulator as claimed in claim 1, wherein said first control movement comprises rotation of said unitary control means.

9. A toy aircraft flight simulator as claimed in claim 8, further including indicator means, means mounted to said unitary control means to sense the angular position of said unitary control means when said control means are rotated in said first control movement, said sensing means activating said indicator means.

10. A toy aircraft flight simulator as claimed in claim 5, wherein said drum rotating means comprise an electric motor and said second control means comprise a variable resistance for controlling the speed of said electric motor.

11. A toy aircraft flight simulator as claimed in claim 1, and further including circuit controlling electrical contacts mounted in fixed relationship adjacent said rotating drum and a plurality of projections carried by said rotating drum for selective engagement with said electrical contacts.

12. A toy aircraft flight simulator as claimed in claim 11, further including manually operated electrical switch means mounted to said unitary control means, first indicator means, said first indicator means being activated when said electrical switch means are activated to simulate a gun firing, at least one of said projections corresponding to a simulated target on said translucent screen, second indicator means, said electrical switch means and a contact activated by said target projection being in electrical circuit with said second indicator means, said second indicator means indicating a hit on said target when said electrical switch and said contact corresponding to said target are simultaneously activated.

13. A toy aircraft flight simulator as claimed in claim 11, further including means for stopping said drum rotating means when one of said electrical contacts is engaged by one of said projections.

14. A toy aircraft flight simulator as claimed in claim 13, wherein said drum rotating means is restarted by selectively disengaging said projection from engagement with said electrical contact.

* * * * *